July 2, 1963　　E. DE GROOT VON ARX　　3,096,202
POLYVINYL PYRROLIDONE PRESSURE SENSITIVE ADHESIVE
AND TAPE CONTAINING SAME
Filed Aug. 30, 1960
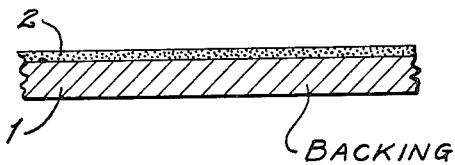
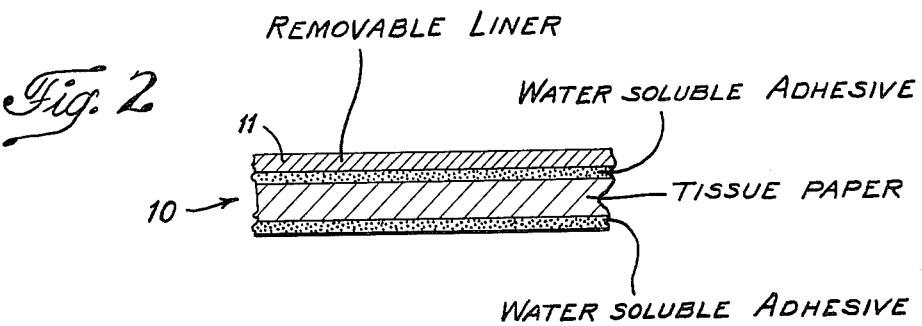
INVENTOR.
ELLEN DeGROOT VON ARX
BY
ATTORNEYS.

United States Patent Office 3,096,202
Patented July 2, 1963

3,096,202
POLYVINYL PYRROLIDONE PRESSURE SENSITIVE ADHESIVE AND TAPE CONTAINING SAME
Ellen deGroot von Arx, Shrewsbury, N.J., assignor to Johnson & Johnson, a corporation of New Jersey
Filed Aug. 30, 1960, Ser. No. 52,815
7 Claims. (Cl. 117—68.5)

The present invention relates to novel normally tacky and pressure-sensitive adhesive compositions which are soluble in water. The invention also includes novel tapes employing such adhesives, and particularly novel splicing tapes which form splices which disintegrate completely in water leaving no objectionable discrete particles in beater stock when they are returned to a beater.

As is well understood by those skilled in the art, in making new paper a large source of paper pulp is repulped salvaged spliced paper. When spliced paper is repulped in the production of new paper, if the adhesive of the splicing tape is insoluble in water, there is present in the newly formed paper, the water-insoluble adhesive components which appear as tiny specks in the paper and detract from the appearance thereof. Accordingly, in order to overcome the aforementioned disadvantages, it is essential that the adhesive used in forming the spliced paper be water soluble when the spliced paper is repulped.

As is well understood by those skilled in the field, spliced paper is often subjected to elevated temperatures. Examples of such are in the coating or printing of spliced paper wherein the paper is passed through drying ovens at elevated temperatures to dry the coating or printed material. The adhesive employed for splicing the paper should be of such nature that it exhibits good hold properties at elevated temperatures. Moreover, for reasons pointed out hereinbefore in detail, it is desirable that the adhesive be water soluble and remain water soluble even when subjected to elevated temperature in order that the spliced paper, if repulped, disintegrates completely in water.

Objects and advantages of the invention will be set forth in part hereinafter and in part will be obvious herefrom, or may be learned by practice with the invention, the same being realized and attained by means of the steps, methods, combinations, improvements and compositions pointed out in the appended claims.

The invention consists in the novel combinations and improvements herein shown and described.

In the drawings:

FIG. 1 is a vertical cross-section of normally tacky and pressure-sensitive adhesive tape comprised of backing 1 coated with a water-soluble normally-tacky and pressure-sensitive adhesive coating 2 formulated in accordance with this invention.

FIG. 2 is a vertical cross-section of a double-coated splicing tape 10 comprised of a porous tissue paper that is impregnated and coated on both sides with a normally tacky water-soluble adhesive formulated in accordance with this invention, and which is provided on one side with a removable liner 11 to permit of unwinding from rolls and handling during application, as in splicing paper in paper mills and printing plants.

It is an object of this invention to provide novel water-soluble, normally-tacky and pressure-sensitive adhesives. It is a further object to provide novel water-soluble, normally-tacky and pressure-sensitive adhesives which retain their water-soluble characteristics after subjection to elevated temperatures. A further object of this invention is to provide novel tapes employing as adhesives, novel water-soluble, normally-tacky and pressure-sensitive adhesives. Yet another object of this invention is to provide a novel splicing tape which is capable of disintegrating completely in water. A further object of this invention is to provide a novel spliced paper capable of being repulped without leaving objectionable discrete particles in beater stock.

It has been found that a water-soluble, normally-tacky and pressure-sensitive adhesive may be produced by combining: (1) a polyvinyl pyrrolidone polymer, (2) a polyfunctional monomeric cross-linking agent, (3) a plasticizer compatible with the polyvinyl pyrrolidone, and (4) an activator catalyst of the type which is capable of inducing vinyl-type polymerization, hereinafter referred to as a "polymerizing inducing agent."

As indicated heretofore, the elastomer used in accordance with the present invention is a polyvinyl pyrrolidone elastomer. Such elastomers have a molecular weight in the range of 100,000 to 400,000, the preferred elastomers having a molecular weight of 300,000 to 400,000.

In order that the adhesive maintains its integrity when subjected to elevated temperatures, the adhesive contains a cross-linking agent and activator catalyst therefor. While any polyfunctional monomeric cross-linking agent may be used in accordance with this invention, it is preferred to use those which contain a functional group selected from the group consisting of vinyl, allyl, acrylic and methacrylic groups. In general, the cross-linking agent is in an amount from about 5 to 50 parts by weight per 100 parts by weight of polyvinyl pyrrolidone elastomer. If employed in amounts substantially less than the above-indicated minimum amount, an insufficient cure is obtained. If the cross-linking agent is in an amount substantially greater than the above-indicated maximum, the water-solubility of the adhesive is impaired. In general, the cross-linking agent has a molecular weight in the range of about 50 to 3000 and preferably about 100 to 300. Examples of typical cross-linking agents are ethylene glycol di-methacrylate, diallyl maleate, di-vinylether of di-ethylene glycol, allyl glycol ether and allyl methacrylate.

As indicated hereinbefore, there is incorporated in the adhesive an activator for accelerating the desired cross-linking of the elastomer when the adhesive is subjected to elevated temperatures such, for example, as the drying temperatures encountered in coating or printing of spliced paper, or if a tape employing such adhesive is subjected to a heat-sealing operation. The activator employed is of the type conventionally employed as a catalyst for inducing vinyl polymerization. Examples of such are the conventional peroxide catalysts such, for example, as benzoyl peroxide, hydrogen peroxide, etc., and the conventional persulfate activators such, for example, as potassium persulfate. As will be well understood by those in the field, other conventional oxygen-giving catalysts or activators which induce vinyl polymerization may be employed. In general, the activator is in an amount from about 0.5 part to about 5 parts per 100 parts of elastomer.

In order that the adhesive have the required amount of flexibility and adhesion, there is incorporated a plasticizer compatible with the polyvinyl pyrrolidone elastomer. The plasticizer which functions as a tackifier is a polyol or polyalkyl glycol ethers. Polyalkyl glycol ethers of aromatic compounds having at least 18 carbon atoms are preferred, the phenylether of polyethylene glycol being particularly suitable. The plasticizer also improves the high temperature stability and adhesiveness of the present compositions. Examples of other suitable plasticizers are glycerin, sorbitol, and hydroxy-polyalkylene compositions such as polyethylene glycol (M.W. 1000) and polypropylene glycol (M.W. 400). The plasticizer is generally in an amount from about 15 to 100 parts per 100 parts elastomer.

The adhesive compositions of the present invention are generally hydrophilic and dissolve in water and polar organic solvents such as ethanol and isopropanol. The selection of a particular vehicle from which to apply the adhesive depends upon the significance of the vehicle's flammability, the method of application and the speed with which the vehicle is desired to be removed. The present adhesive compositions permit the use of water as a vehicle, eliminating fire hazard entirely in contrast to the usual adhesive which must be used with organic solvents which usually are extremely flammable. Ethanol may be employed with the present adhesives if ease of removing the solvent vehicle is of first importance.

The following examples are given in order to illustrate water-soluble, normally tacky and pressure-sensitive adhesives formulated in accordance with the present invention:

*Example 1*

| | Pts. |
|---|---|
| Polyvinyl pyrrolidone (M.W.=300,000–400,000) | 55 |
| Phenyl ether of polyethylene glycol (18–200 carbon atoms) | 34 |
| Ethylene glycol di-methacrylate | 10 |
| Benzoyl peroxide | 1 |

*Example 2*

| | Pts. |
|---|---|
| Polyvinyl pyrrolidone | 60 |
| Glycerine | 25 |
| Ethylene glycol di-methacrylate | 14 |
| Benzoyl peroxide | 1 |

*Example 3*

| | Pts. |
|---|---|
| Polyvinyl pyrrolidone (M.W.=300,000–400,000) | 55 |
| Phenyl ether of polyethylene glycol (18–200 carbon atoms) | 34 |
| Diallyl maleate | 10 |
| Benzoyl peroxide | 1 |

*Example 4*

| | Pts. |
|---|---|
| Polyvinyl pyrrolidone (M.W.=300,000–400,000) | 55 |
| Phenyl ether of polyethylene glycol (18–200 carbon atoms) | 34 |
| Di-vinylether of di-ethylene glycol | 10 |
| Benzoyl peroxide | 1 |

*Example 5*

| | Pts. |
|---|---|
| Polyvinyl pyrrolidone (M.W.=300,000–400,000) | 55 |
| Phenyl ether of polyethylene glycol (18–200 carbon atoms) | 34 |
| Allyl glycol ether | 10 |
| Benzoyl peroxide | 1 |

*Example 6*

| | Pts. |
|---|---|
| Polyvinyl pyrrolidone (M.W.=300,000–400,000) | 55 |
| Phenyl ether of polyethylene glycol (18–200 carbon atoms) | 34 |
| Allyl methacrylate | 10 |
| Potassium persulfate | 1 |

In producing an adhesive tape in accordance with this invention, any suitable conventional tape backing may be used (e.g., cellophane, vinyl films, terephthalate films, paper, cloth, metal face, etc.). In order that the tape be capable of disintegrating in water, it is preferred that the backing be a water-dispersible film or web such as unsized tissue or water-soluble polyvinyl alcohol film. As is well understood by those in the field, when the tape is wound in roll form, there may be used an interliner or a release-coating (e.g., polyethylene) on the back side of the backing in order to facilitate easy unwind of the tape roll.

As indicated hereinbefore, important embodiments of the present invention relate to splicing tapes. In producing splices, different methods may be used. One method involves the use of a double coating splicing tape (as shown in FIG. 2). In the double-coated tape of FIG. 2, both faces of the tape are provided with an adhesive coating whereby the tape can be applied to the butt end of one web of paper and then the tip portion of the other web can be overlapped to form the desired splice.

An alternative method for forming a splicing sheet is to apply the adhesive to interliner material such as polyethylene and interleaf the tissue paper on the adhesive in the wet or dry state.

The invention in its broader aspects is not limited to the specific compositions, combinations and improvements described, but departures may be made therefrom within the scope of the accompanying claims without departing from the principles of the invention and without sacrificing its chief advantages.

What is claimed is:

1. A water-soluble normally tacky and pressure-sensitive adhesive comprising: a polyvinyl pyrrolidone elastomer, a polyfunctional monomeric cross-linking agent having at least two functional groups selected from the group consisting of vinyl, allyl, acrylic and methacrylic groups, said cross-linking agent being in an amount from about 5 to 50 parts by weight per 100 parts by weight of polyvinyl pyrrolidone elastomer, a plasticizer compatible with the polyvinyl pyrrolidone elastomer selected from the group consisting of polyols and polyalkyl glycol ethers, said plasticizer being in an amount from about 15 to about 100 parts by weight per 100 parts of polyvinyl pyrrolidone elastomer, and an activator catalyst of the type capable of inducing vinyl-type polymerization in an amount from about 0.5 to about 5 parts by weight per 100 parts of polyvinyl pyrrolidone elastomer.

2. A water-soluble normally tacky and pressure-sensitive adhesive according to claim 1, wherein the activator catalyst is selected from the group consisting of peroxide and persulfate catalysts.

3. A water-soluble normally tacky and pressure-sensitive adhesive according to claim 1, wherein the plasticizer is a hydroxy-polyalkylene composition.

4. An adhesive tape comprising a flexible backing coated on at least one major surface with a water-soluble, normally tacky and pressure-sensitive adhesive comprising: a polyvinyl pyrrolidone elastomer, a polyfunctional monomeric cross-linking agent having at least two functional groups selected from the group consisting of vinyl, allyl, acrylic and methacrylic groups, said cross-linking agent being in an amount from about 5 to 50 parts by weight of polyvinyl pyrrolidone elastomer, a plasticizer compatible with the polyvinyl pyrrolidone elastomer selected from the group consisting of polyols and polyalkyl glycol ethers, said plasticizer being in an amount from about 15 to about 100 parts by weight per 100 parts of polyvinyl pyrrolidone elastomer, and an activator catalyst of the type capable of inducing vinyl-type polymerization in an amount from about 0.5 to about 5 parts by weight per 100 parts of polyvinyl pyrrolidone elastomer.

5. An adhesive tape according to claim 4, wherein the backing is of such nature that it is capable of disintegrating in water.

6. An adhesive tape according to claim 4, wherein the backing is a water-soluble polyinvyl alcohol film.

7. A splicing tape comprising a tissue paper impregnated and coated on both faces with a water-soluble, normally tacky and pressure-sensitive adhesive comprising: a polyvinyl pyrrolidone elastomer, a polyfunctional monomeric cross-linking agent having at least two functional groups selected from the group consisting of vinyl, allyl, acrylic and methacrylic groups, said cross-linking agent being in an amount from about 5 to 50 parts by weight per 100 parts by weight of polyvinyl pyrrolidone elastomer, a plasticizer compatible with the polyvinyl pyrrolidone elastomer selected from the group consisting of polyols and polyalkyl glycol ethers, said plasticizer being in an amount from about 15 to about 100 parts by weight per 100 parts of polyvinyl pyrrolidone elastomer, and an activator catalyst of the type capable of inducing vinyl-type polymerization in an amount from about 0.5 to about 5 parts by weight per 100 parts of polyvinyl pyrrolidone elastomer.

References Cited in the file of this patent

UNITED STATES PATENTS 2,183,330     Drew ------------------ Dec. 12, 1939

FOREIGN PATENTS 210,051     Australia --------------- Dec. 6, 1956

OTHER REFERENCES

Schildknecht: Vinyl and Related Polymers, page 678, Wiley and Sons, New York, 1952.